(12) United States Patent
Shao et al.

(10) Patent No.: US 11,829,120 B1
(45) Date of Patent: Nov. 28, 2023

(54) INDUSTRIAL INTERNET OF THINGS SYSTEM CONDUCIVE TO SYSTEM SCALABILITY AND CONTROL METHOD THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yaqiang Quan, Chengdu (CN); Bin Liu, Chengdu (CN); Yong Li, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/819,927

(22) Filed: Aug. 15, 2022

(30) Foreign Application Priority Data

May 13, 2022 (CN) .......................... 202210516624.3

(51) Int. Cl.
*H04L 67/125* (2022.01)
*G16Y 10/25* (2020.01)
(Continued)

(52) U.S. Cl.
CPC .......... *G05B 19/4185* (2013.01); *G16Y 10/25* (2020.01); *G16Y 20/10* (2020.01);
(Continued)

(58) Field of Classification Search
CPC ........ G16Y 10/25; G16Y 20/10; G16Y 40/10; G16Y 40/30; H04L 67/125
See application file for complete search history.

(56) References Cited

U.S. PATENT DOCUMENTS 9,752,840 B1   9/2017 Betro
10,575,072 B1  2/2020 Shao
(Continued)

FOREIGN PATENT DOCUMENTS

| CN | 113141381 A | 7/2021 |
| CN | 114449023 A | 5/2022 |
| WO | 2015075736 A2 | 5/2015 |

OTHER PUBLICATIONS

First Office Action in Chinese Application No. 202210516624.3 dated Jun. 20, 2022, 12 pages.
(Continued)

*Primary Examiner* — Manuel A Rivera Vargas
(74) *Attorney, Agent, or Firm* — METIS IP LLC

(57) ABSTRACT

The present disclosure provides an Industrial Internet of Things system conducive to system scalability and control method thereof. The system comprises a user platform, a service platform, a management platform, a sensor network platform, and an object platform. The service platform or the sensor network platform adopts independent layout. The service platform and the sensor network platform both include sub platforms and each sub platform is provided with a database, a processor, and/or an information channel. The object platform includes a production line, and the production line is configured with a plurality of sensors. In each sub platform of the sensor network platform, a same communication protocol is used with the sensors connected to a same sub platform of the sensor network platform. Any sub platform of the sensor network platform is connected with a unique sub platform of the service platform through the management platform.

9 Claims, 5 Drawing Sheets

(51) Int. Cl.
　　　*G16Y 20/10*　　　(2020.01)
　　　*G05B 19/418*　　(2006.01)
　　　*G16Y 40/10*　　　(2020.01)
　　　*G16Y 40/30*　　　(2020.01)

(52) U.S. Cl.
　　　CPC ............. *G16Y 40/10* (2020.01); *G16Y 40/30* (2020.01); *H04L 67/125* (2013.01); *G05B 2219/32335* (2013.01); *G05B 2219/45244* (2013.01)

(56) References Cited

U.S. PATENT DOCUMENTS

| | | | |
|---|---|---|---|
| 11,619,928 B1* | 4/2023 | Shao | G05B 19/41835 700/28 |
| 2019/0041845 A1 | 2/2019 | Cella et al. | |
| 2020/0225655 A1* | 7/2020 | Cella | G05B 19/41875 |
| 2020/0300662 A1 | 9/2020 | Shao | |
| 2020/0412565 A1* | 12/2020 | Sanders | H04L 12/2801 |

OTHER PUBLICATIONS

Shao, Zehua, Research on Intelligent Gas Meter Cloud Platform, Gas & Heat, 38(3): B30-B34, 2018.

* cited by examiner

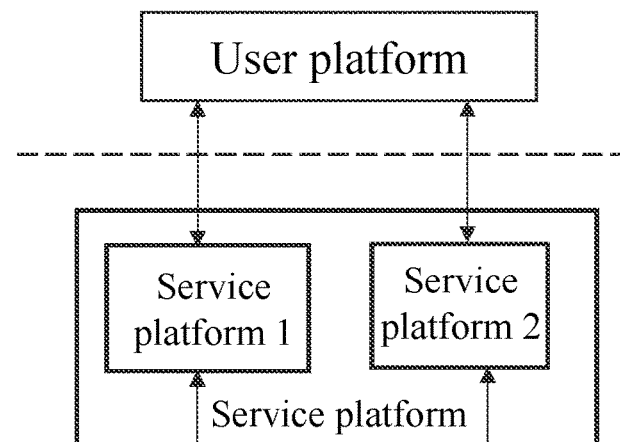
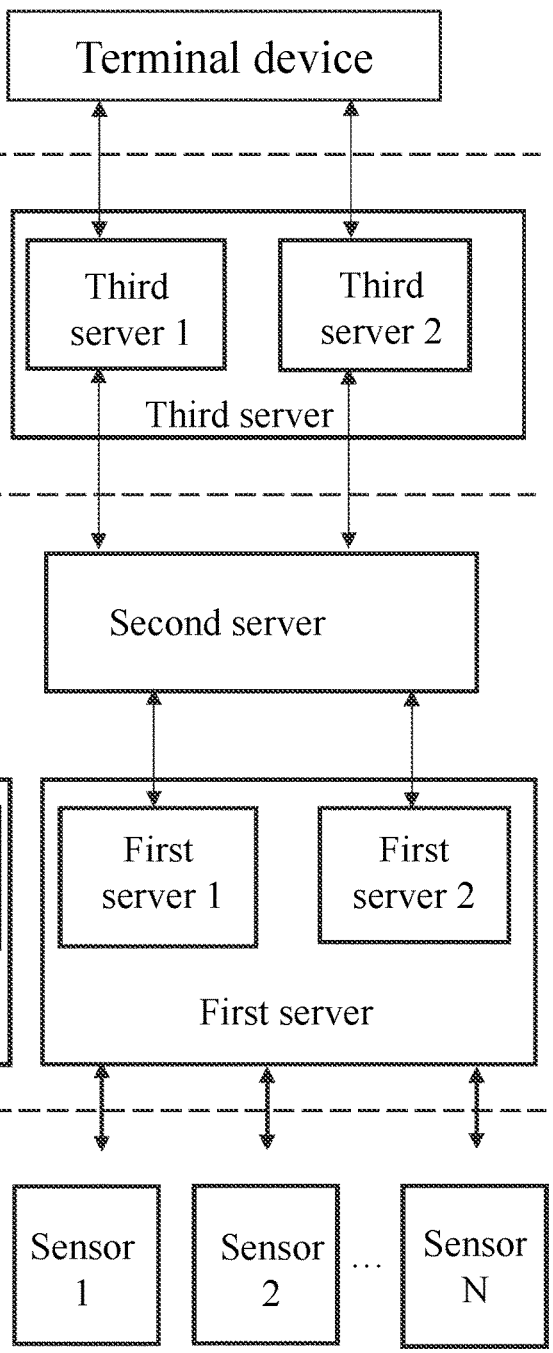
FIG. 1

200

```
┌─────────────────────────────────────────────────┐
│  The object platform is configured to include a │
│  production line for manufacturing parts and/or │
│  forming assemblies, and the production line is │
│  configured with a plurality of sensors serving │
│         manufacturing and/or assembly           │
└─────────────────────────────────────────────────┘
                        │
                        ▼
┌─────────────────────────────────────────────────┐
│ In each sub platform of the sensor network      │
│ platform, any sub platform of the sensor network│
│ platform is connected to some sensors in the    │
│ plurality of sensors, and a same communication  │
│ protocol is used with the sensors connected to  │
│ a same sub platform of the sensor network       │
│ platform                                        │
└─────────────────────────────────────────────────┘
                        │
                        ▼
┌─────────────────────────────────────────────────┐
│ Any sub platform of the sensor network platform │
│ is connected with a unique sub platform of the  │
│ service platform through the management         │
│ platform, and different sub platforms of the    │
│ sensor network platform establish data          │
│ connections with different sub platforms of the │
│ service platform                                │
└─────────────────────────────────────────────────┘
                        │
                        ▼
┌─────────────────────────────────────────────────┐
│ According to a connection relationship          │
│ established between the sub platform of the     │
│ service platform and the sub platform of the    │
│ sensor network platform, the management         │
│ platform transfers and stores monitoring data   │
│ of any sub platform of the sensor network       │
│ platform to the sub platform of the service     │
│ platform connected to the sub platform of the   │
│ sensor network platform                         │
└─────────────────────────────────────────────────┘
```

310 — Obtaining injection molded part information of the injection molded part by the sub platforms of the sensor network platform

320 — Determining the supplementary data by the sub platforms of the sensor network platform through a data supplement model based on the monitoring data and the injection molded part information, the data supplement model being a trained machine learning model

FIG. 3

INDUSTRIAL INTERNET OF THINGS SYSTEM CONDUCIVE TO SYSTEM SCALABILITY AND CONTROL METHOD THEREOF

CROSS-REFERENCE TO RELATED APPLICATIONS

This application claims priority of Chinese Patent Application No. 202210516624.3, filed on May 13, 2022, the contents of which are hereby incorporated by reference to its entirety.

TECHNICAL FIELD

The present disclosure generally relates to intelligent manufacturing technology, in particular, to Industrial Internet of Things system conducive to system scalability and control method thereof.

BACKGROUND

In the field of product intelligent manufacturing, the intelligent product production line involves a plurality of intelligent manufacturing equipment. A plurality of intelligent manufacturing equipment are set up according to an upstream and downstream relationship, and parts, components, or products to be manufactured are assembled in turn to form products. In the prior art, the upstream and downstream intelligent manufacturing units have a specific time sequence, and a trigger of specific manufacturing and detection actions is based on the detection value of the sensor on a current station or an upstream station. With the continuous expansion of the scale of the existing Industrial Internet of Things, the entire Industrial Internet of Things system includes the following forms of Industrial Internet of Things system: the sensor network platform being used as the medium for information transmission between the object platform and the management platform, the user platform being used as the medium for human-computer interaction between the Industrial Internet of Things system and users, and a service platform is set between the user platform and the management platform as the service communication channel between them.

In practical application, it is generally necessary to adjust the matching of industrial Internet of Things system according to needs of production plan, product quality control, process improvement, detection means and detection improvement, and safety management improvement. The existing adjustment methods mainly occur on an object platform. Providing an Industrial Internet of Things structure system that can be better applicable to the expansion of Industrial Internet of Things will promote the development of Internet of Things technology.

SUMMARY

The technical problem to be solved by the present disclosure is to provide an Industrial Internet of Things system conducive to system scalability and control method thereof. The technical scheme can facilitate a function expansion and system adjustment of the Internet of Things system through reasonable structural system layout and control method optimization.

The present disclosure is realized by the following technical scheme: an Industrial Internet of Things system conducive to system scalability, comprising: a user platform, a service platform, a management platform, a sensor network platform, and an object platform which are interacted sequentially. The service platform and the sensor network platform adopt independent layout, and the management platform adopts centralized layout. The independent layout means that a platform has a plurality of independent databases, processors, and/or information channels, according to a classification of data, different types of data are stored in different databases, processed by different processors, and/or transmitted by different information channels. The service platform and the sensor network platform both include a plurality of sub platforms, and each sub platform is provided with a database, a processor, and/or an information channel. The centralized layout means that a platform receives data, processes data, and sends data uniformly. The object platform is configured to include a production line for manufacturing parts and/or forming assemblies, and the production line is configured with a plurality of sensors serving manufacturing and/or assembly. In each sub platform of the sensor network platform, any sub platform of the sensor network platform is connected to some sensors in the plurality of sensors, and a same communication protocol is used with the sensors connected to a same sub platform of the sensor network platform; and a number count of sub platforms of the service platform is greater than or equal to a count of sub platforms of the sensor network platform, any sub platform of the sensor network platform is connected with a unique sub platform of the service platform through the management platform, and different sub platforms of the sensor network platform establish data connections with different sub platforms of the service platform.

One of the embodiments of the present disclosure provides an industrial Internet of Things system conducive to system scalability, the sensor network platform is configured such that a count of sensors connected to each sub platform of the sensor network platform is greater than or equal to 1. The sensor network platform is configured to include databases for storing received monitoring data from the sensors; and in each sub platform of the sensor network platform, when the count of sensors connected to the sub platform of the sensor network platform is greater than 1, monitoring data from different sensors is stored in different addresses of the databases.

One of the embodiments of the present disclosure provides an industrial Internet of Things system conducive to system scalability, the sub platform of the sensor network platform is configured to include a data upload module and a processor, the processor sends the monitoring data in the database to the management platform according to settings of the processor or query instructions sent to the processor by the management platform; when the processor determines that the monitoring data of a sensor is missing, the processor uploads the monitoring data or a processing result in the database to the management platform according to the settings of the processor or the query instructions sent to the processor by the management platform; and the processing result is: taking the monitoring data stored in the database within a set time period as a calculation basis, taking a change trend of the monitoring data within the set time period as a calculation function, determining supplementary data at a specific time of data loss according to the specific time of data loss, and taking the supplementary data as the processing result.

One of the embodiments of the present disclosure provides an industrial Internet of Things system conducive to system scalability, the production line is used to produce injection molded part, and the monitoring data includes a holding pressure, a mold temperature, a melt temperature, and a holding time at each time when the injection molded part are produced, when at least one of the holding pressure, the mold temperature, and the melt temperature at a certain time is missing, the sub platforms of the sensor network platform are further configured to: obtain injection molded part information of the injection molded part; and determine the supplementary data through a data supplement model based on the monitoring data and the injection molded part information, and the data supplement model is a trained machine learning model.

One of the embodiments of the present disclosure provides an industrial Internet of Things system conducive to system scalability, the injection molded part information includes injection molded part structural parameters of the injection molded part, and the injection molded part structural parameters at least include a wall thickness, a volume, a relative surface area, a count of symmetrical planes, a count of stiffeners, a count of planes, and a count of edges of the injection molded part.

One of the embodiments of the present disclosure provides an industrial Internet of Things system conducive to system scalability, the data supplement model comprises a feature extraction layer, a fusion layer, and a data supplement layer, the feature extraction layer is configured to process the injection molded part structural parameters of the injection molded part and determine a complexity vector of the injection molded part; the fusion layer is configured to process the complexity vector and the monitoring data to determine a fusion feature vector at each time when producing the injection molded part; and the data supplement layer is configured to process the fusion feature vector at each time when producing the injection molded part to determine supplemented monitoring data, and the One of the embodiments of the present disclosure provides an industrial Internet of Things system conducive to system scalability, the fusion layer comprises a plurality of neural network layers, and the plurality of neural network layers share parameters.

One of the embodiments of the present disclosure provides an industrial Internet of Things system conducive to system scalability, the monitoring data used as calculation basis is all data of sensors with missing monitoring data stored in the sensor network platform; a way that the sensor network platform stores the monitoring data is: for any sensor, according to database storage space set for the monitoring data from the sensor, when there is idle available space in the database storage space, new monitoring data continuing to expand a data storage capacity of the database; when the database storage space reaches a maximum storage capacity, maintaining the data storage capacity in the database, and monitoring data written in real time covering the monitoring data with an earliest storage time in the database; and when the processor determines that the monitoring data of a sensor is missing, the sub platform of the sensor network platform connected with the sensor uploading a prompt data instruction including an identification of a faulty sensor to the management platform, the faulty sensor being a sensor with missing monitoring data.

One of the embodiments of the present disclosure provides an industrial Internet of Things system conducive to system scalability, any sub platform of the sensor network platform and sub platform of the service platform establishing data connection with the sub platform of the sensor network platform are configured as: the management platform receiving the monitoring data from the sub platform of the sensor network platform and sending the monitoring data to the sub platform of the service platform, the sub platform of the service platform storing and processing received monitoring data and transmitting the monitoring data and/or data processing results to the user platform, respectively.

One of the embodiments of the present disclosure provides an industrial Internet of Things system conducive to system scalability, any sub platform of the sensor network platform is configured to include a driver download module for downloading drivers from the sub platforms of the service platform establishing data connection with the sub platforms of the sensor network platform; and the sub platform of the sensor network platform replace an original driver after receiving a new driver.

One of the embodiments of the present disclosure provides an industrial Internet of Things system conducive to system scalability, the management platform is configured to store a control program that drives operation of production line equipment; the service platform is configured as databases storing control parameters; the management platform calls the control parameters in the database through communication channels with the service platform and configures the control parameters in the control program to control the operation of production line equipment; and a data interaction mode between the user platform and the service platform is configured to modify and delete the control parameters in the service platform through data transmission between the user platform and the service platform.

One of the embodiments of the present disclosure provides an industrial Internet of Things system conducive to system scalability, the control parameters are stored in the databases of the service platform in a form of arrays; each array includes all the control parameters required by the control program, the management platform calls a group of arrays by the service platform at a single time for configuring the control program; a database storing the control parameters is located on a unique sub platform of the service platform; and the unique sub platform of the service platform refers to: in the sub platform of the service platform, a sub platform for establishing data connection with the sub platform of the sensor network platform and a sub platform for storing the control parameters are different sub platforms.

One of the embodiments of the present disclosure provides a control method of an Industrial Internet of Things system conducive to system scalability, the control method is applied to the Industrial Internet of Things system, the Industrial Internet of Things system comprises a user platform, a service platform, a management platform, a sensor network platform, and an object platform which are interacted sequentially; the service platform and the sensor network platform adopt independent layout, and the management platform adopts centralized layout; the independent layout means that a platform has a plurality of independent databases, processors, and/or information channels, according to a classification of data, different types of data are stored in different databases, processed by different processors and/or transmitted by different information channels; the service platform and the sensor network platform both include a plurality of sub platforms, and each sub platform is provided with a database, a processor, and/or an information channel; the centralized layout means that a platform receives data, processes data and sends data uniformly; the object platform is configured to include a production line for manufacturing parts and/or forming assemblies, and the production line is configured with a plurality of sensors serving manufacturing and/or assembly; in each sub platform of the sensor network platform, any sub platform of the sensor network platform is connected to some sensors in the plurality of sensors, and a same communication protocol is used with the sensors connected to a same sub platform of the sensor network platform; a count of sub platforms of the service platform is greater than or equal to a count of sub platforms of the sensor network platform, any sub platform of the sensor network platform is connected with a unique sub platform of the service platform through the management platform, and different sub platforms of the sensor network platform establish data connections with different sub platforms of the service platform; the user platform receives data from the service platform and modifies data in the service platform by interacting with the service platform; the management platform transmits and stores operation data of the object platform to the service platform according to settings through the sensor network platform; the management platform receives data from the service platform and controls operations of the object platform; according to a connection relationship established between the sub platform of the service platform and the sub platform of the sensor network platform, the management platform transfers and stores monitoring data of any sub platform of the sensor network platform to the sub platform of the service platform connected to the sub platform of the sensor network platform.

One of the embodiments of the present disclosure provides a control method of an Industrial Internet of Things system conducive to system scalability, any sub platform of the service platform is that address information of a corresponding sensor is stored, the corresponding sensor is a sensor connected to a corresponding sub platform of the sensor network platform, and the corresponding sub platform of the sensor network platform is the sub platform of the sensor network platform connected with sub platform data of the service platform; the user platform receives the address information from the service platform through interaction with the service platform; and in any sub platform of the service platform, for the monitoring data from any sensor, the monitoring data is associated with the address information of the corresponding sensor.

One of the embodiments of the present disclosure provides a control method of an Industrial Internet of Things system conducive to system scalability, the sensor network platform is configured such that a count of sensors connected to each sub platform of the sensor network platform is greater than or equal to 1; the sensor network platform includes databases for storing received monitoring data from the sensors; and the control method further comprises: in each sub platform of the sensor network platform, when the count of sensors connected to the sub platform of the sensor network platform is greater than 1, monitoring data from different sensors is stored in different addresses of the databases.

One of the embodiments of the present disclosure provides a control method of an Industrial Internet of Things system conducive to system scalability, the sub platform of the sensor network platform is configured to include a data upload module and a processor, the processor sends the monitoring data in the database to the management platform according to settings of the processor or query instructions sent to the processor by the management platform; the control method further comprises operations: when the processor determines that monitoring data of a sensor is missing, the processor uploads the monitoring data or a processing result in the database to the management platform according to the settings of the processor or the query instructions sent to the processor by the management platform; and the processing result is: taking the monitoring data stored in the database within a set time period as a calculation basis, taking a change trend of the monitoring data within the set time period as a calculation function, determining supplementary data at a specific time of data loss according to the specific time of data loss, and taking the supplementary data as the processing result.

One of the embodiments of the present disclosure provides a control method of an Industrial Internet of Things system conducive to system scalability, the production line is used to produce an injection molded part, and the monitoring data includes a holding pressure, a mold temperature, a melt temperature, and a holding time at each time when the injection molded part are produced, when at least one of the holding pressure, the mold temperature, and the melt temperature at a certain time is missing, the determining supplementary data at a specific time of data loss comprises: obtaining injection molded part information of the injection molded part; and determining the supplementary data through a data supplement model based on the monitoring data and the injection molded part information, and the data supplement model is a trained machine learning model.

One of the embodiments of the present disclosure provides a control method of an Industrial Internet of Things system conducive to system scalability, the injection molded part information includes injection molded part structural parameters of the injection molded part, and the injection molded part structural parameters at least include a wall thickness, a volume, a relative surface area, a count of symmetrical planes, a count of stiffeners, a count of planes, and a count of edges of the injection molded part.

One of the embodiments of the present disclosure provides a control method of an Industrial Internet of Things system conducive to system scalability, the data supplement model comprises a feature extraction layer, a fusion layer and a data supplement layer, the feature extraction layer is configured to process the injection molded part structural parameters and determine a complexity vector of the injection molded part; the fusion layer is configured to process the complexity vector and the monitoring data to determine a fusion feature vector at each time when producing the injection molded part; and the data supplement layer is configured to process the fusion feature vector at each time when producing the injection molded part to determine supplemented monitoring data, the supplemented monitoring data includes the supplementary data.

One of the embodiments of the present disclosure provides a control method of an Industrial Internet of Things system conducive to system scalability, the fusion layer comprises a plurality of neural network layers, and the plurality of neural network layers share parameters.

Compared with the prior art, the invention has the following beneficial effects.

The design purpose of the scheme is to provide a technical scheme that can facilitate the function expansion and system adjustment of the Internet of things system on a premise of simplifying a complexity of the Industrial Internet of Things system, according to characteristics of widespread heterogeneity of sensor data and a large count of sensors in the Industrial Internet of Things system.

In more detail, the sub platform of the sensor network platform may be configured to include a first processor and a first database, the first processor is configured to parse monitoring data from a sensor access, and the first database may be configured to store the monitoring data from the sensor access or data obtained after parsing. The sub platforms of the service platform may be configured to include a third processor and a third database. The third processor is configured to establish a communication between the service platform sub platform, the management platform, and the user platform, which is used to perform other computing tasks on the service platform sub platform. The third database may be configured to store data sent from a sub platform of the sensor network platform establishing data connection with the third database. At the same time, it may be set as follows: a count of sub platforms of the service platform may be greater than or equal to a count of sub platforms of the sensor network platform. In this way, in terms of data connection, it may be possible to establish a physical connection between a single sub platform of the sensor network platform and an independent sub platform of the service platform. In some embodiments, when the monitoring data converted by a same first processor is allocated by the management platform and stored in a specific sub platform of the service platform, different third databases may be selected for data storage according to different communication protocols. In a later stage, whether the monitoring data is processed through each sub platform of the service platform, or is it that the user platform obtains these monitoring data from the sub platform of the service platform and then processes the data, through a relationship between the service platform and the sensor network platform, the monitoring data with the above similarities may be stored differently in the third database, and the monitoring data may be read through the third processor on each sub platforms of the service platform or an adopted user platform before centralized processing, the above similarities facilitate using same data rules or framework to obtain more accurate and more corresponding processing results. In some embodiments, the centralized processing may be configured to perform data compensation processing on each monitoring data of these sensors before performing data change trend analysis.

At the same time, the scheme may be set as follows: sensors connected with a same sub platform of sensor network platform may adopt a same communication protocol, and it may also realize that during construction or optimization of the Industrial Internet of Things system, a variety of different types of sub platforms of the sensor network platform may be configured according to data transmission needs of each sensor. This method not only solves problems such as high requirements for data processing capacity, data transmission capacity, and data heterogeneity adaptability brought about by the gateway configuration when a single gateway is responsible for a conversion of a plurality of communication protocols, but also adds sub platforms of the sensor network platform according to communication protocols of newly added sensors in a process of adding sensor detection points or an amount of the monitoring data by using data processing and data transmission redundancy of existing sub platforms of the sensor network platform, the newly added sensors may be connected to the existing sensor network platform. In this way, whether it is an interactive debugging between the management platform and the sensor network platform or an interactive debugging between the sensor network platform and the object platform, compared with a centralized sensor network platform, it is convenient for system integration and conducive to a function expansion and system adjustment of the Internet of things system.

At the same time, the management platform may be set in a centralized layout in this scheme, which aims to realize that: for a relatively mature process that has been formed in a production process of the industrial Internet of things, one or more of a logical framework of a control program for an implementation of the process, an encryption mechanism in a data transmission process, and computing core areas that require high computing performance are concentrated on the management platform, which is conducive to the reliability and stability of the Industrial Internet of Things system.

BRIEF DESCRIPTION OF THE DRAWINGS

The present disclosure will be further described in the form of exemplary embodiments, which will be described in detail by the accompanying drawings. These embodiments are not restrictive. In these embodiments, the same number represents the same structure, wherein:

FIG. 1 shows a structural framework of an Industrial Internet of Things system conducive to system scalability;

FIG. 2 shows a flowchart of a control method of an Industrial Internet of Things system conducive to system scalability;

FIG. 3 shows an exemplary flowchart of determining supplementary data according to some embodiments of the present disclosure;

DETAILED DESCRIPTION

Figure 4:
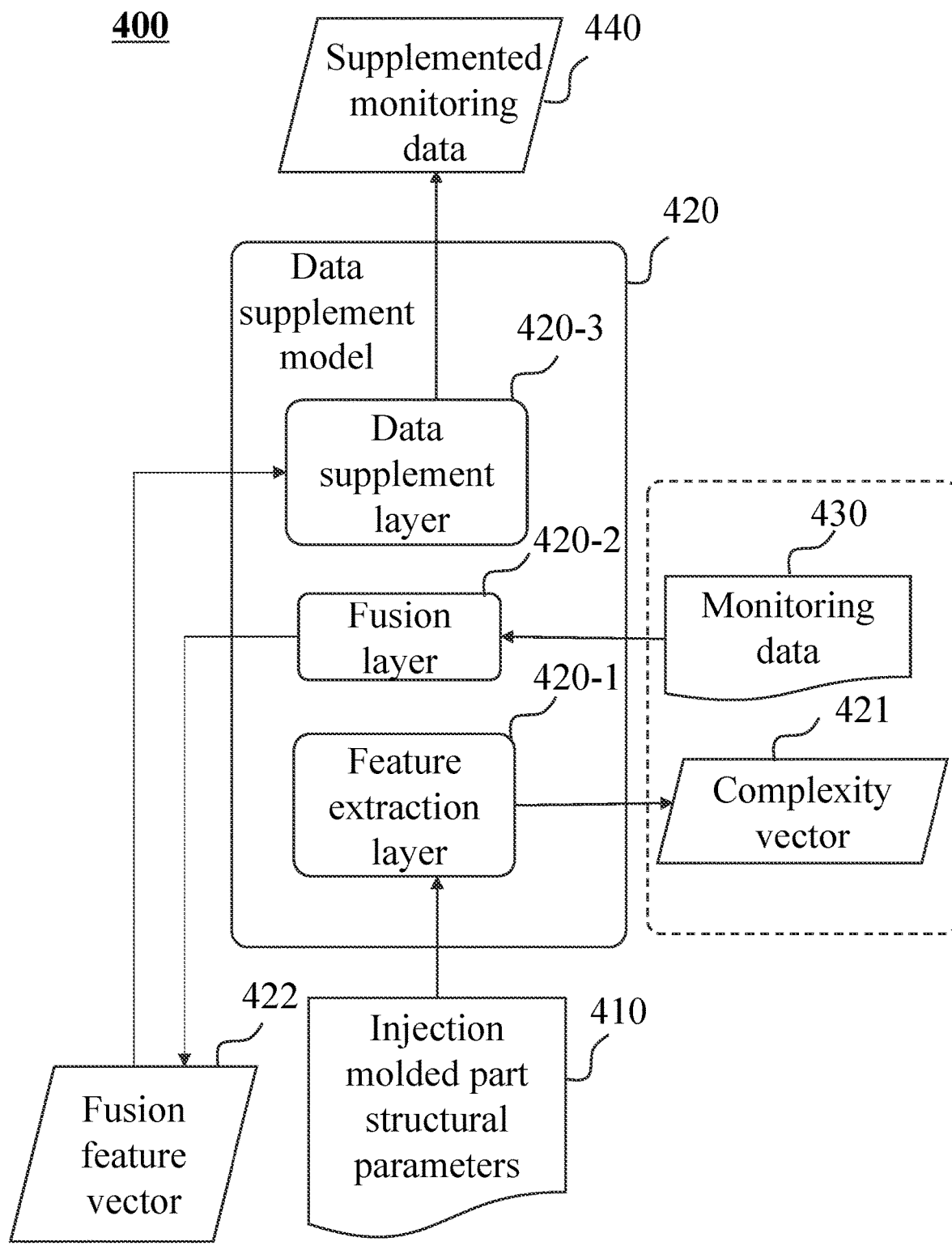
FIG. 4 shows a schematic diagram of a data supplement model according to some embodiments of the present disclosure.

In order to more clearly explain the technical scheme of the embodiments of the present disclosure, the following will briefly introduce the drawings that need to be used in the description of the embodiments. Obviously, the drawings in the following description are only some examples or embodiments of the present disclosure. For those skilled in the art, the present disclosure can also be applied to other similar scenarios according to these drawings without creative work. Unless it is obvious from the language environment or otherwise stated, the same label in the figure represents the same structure or operation.

As shown in FIG. 1, the first embodiment of the present disclosure aims to provide an Industrial Internet of Things system conducive to system scalability. The Industrial Internet of Things system conducive to system scalability includes a user platform, a service platform, a management platform, a sensor network platform, and an object platform which are interacted sequentially. The service platform and the sensor network platform may adopt independent layout, and the management platform may adopt centralized layout.

The independent layout may mean that a platform has a plurality of independent databases, processors, and/or information channels according to a classification of data, different types of data are stored in different databases, processed by different processors, and/or transmitted by different information channels.

The service platform and the sensor network platform may both include a plurality of sub platforms, and each sub platform is provided with a database, a processor, and/or an information channel.

The centralized layout may mean that a platform receives data, processes data and sends data uniformly.

The object platform may be configured to include a production line for manufacturing parts and/or forming assemblies, and the production line may be configured with a plurality of sensors serving manufacturing and/or assembly.

In each sub platform of the sensor network platform, any sub platform of the sensor network platform may be connected to some sensors in the plurality of sensor, and a same communication protocol may be used with the sensors connected to a same sub platform of the sensor network platform.

A count of sub platforms of the service platform may be greater than or equal to a count of sub platforms of the sensor network platform, any sub platform of the sensor network platform may be connected with a unique sub platform of the service platform through the management platform, different sub platforms of the sensor network platform may establish data connections with different sub platforms of the service platform.

In some embodiments, as a person skilled in the art, the sensor may be used for any one or more of the following functions: monitoring working parameters of the production line equipment, such as a running speed of a transmission device, a pressure value of a pressure medium such as gas and oil circuits, and working current of electric drive equipment; monitoring environmental parameters of the production line equipment, such as temperature and humidity of working environment, obstacles in a manipulator action space, etc.; monitoring posture of materials on the production line, such as whether the materials are in a posture that can be grabbed or picked up correctly; monitoring positions of materials on the production line, such as whether the materials are in a position that can be grabbed or picked up correctly, whether the materials are in a correct transfer position, etc.; monitoring quantity of materials on the production line, such as a quantity of materials between processes on the production line that affect a process connection between processes, remaining quantity of materials as raw materials in a hopper, etc.; monitoring a constraint form of the production line on materials, etc.

At the same time, the sensors with a same communication protocol may be interpreted as: the monitoring data output by the sensor, the monitoring data that needs to be sent to the management platform through the sensor network platform, and the monitoring data sent to the sensor network platform are a same type of data. The type may be interpreted as the same communication protocol, and the monitoring data sent to the sensor network platform by sensors with different communication protocols may be different types of data. For the monitoring data of a plurality of sensors of the same type, a single sub platform of the sensor network platform may be used to complete a data interaction between the object platform and the management platform. According to a count of sensors belonging to the same communication protocol, data access ability, data interaction ability, and data processing ability of the sub platform of the sensor network platform, more than one sub platform of the sensor network platform may be used to complete a data interaction between the sensor and the management platform under the same communication protocol. That is, for a plurality of sensors of the same type, each sub platform of a single sensor network platform or each sub platform of more than one sensor network platform are used to complete communication between these sensors and the management platform.

This scheme is aimed at an existing Industrial Internet of Things architecture design, during product manufacturing, according to structural characteristics of a specific manufactured object, generally after a process design is completed, an actuator used for product manufacturing and testing in the production line that completes a production process may be fixed. In order to complete the production orderly, according to a scale of the industrial Internet of things, sensors matching a count of control parameters need to be set. Unlike actuators that directly serve manufacturing and testing, these sensors may have shorter service cycles and wider procurement sources. Therefore, in a complete system of the industrial Internet of things, they have characteristics of a large count of sensors and a variety of communication protocols. In the existing technology, common ways to solve a problem of heterogeneity of monitoring data sources may include using gateway of OSGi architecture to solve a problem of difference in monitoring data format through a method of XML format data; a dynamic gateway may be adopted, specifically, the dynamic gateway may dynamically find and reload drivers that match a protocol type according to a protocol type of a specific sensor being accessed, so that the gateway can meet needs of current sensor access.

A design purpose of this scheme is to provide a technical scheme that can facilitate the function expansion and system adjustment of the Internet of things system on a premise of simplifying a complexity of the Industrial Internet of Things system, according to characteristics of widespread heterogeneity of sensor data and a large number of sensors in the Industrial Internet of Things system.

In more detail, the sub platform of the sensor network platform may be configured to include a first processor and a first database, the first processor may be configured to parse monitoring data from a sensor access, and the first database may be configured to store the monitoring data from the sensor access or data obtained after parsing. The sub platform of the service platform may be configured to include a third processor and a third database. The third processor may be configured to establish communications between the sub platform of the service platform, the management platform and the user platform, which is used to perform other computing tasks on the sub platform of the service platform. The third database may be configured to store data sent from a sub platform of the sensor network platform establishing data connection with the third database. At the same time, it may be set as follows: a count of sub platforms of the service platform may be greater than or equal to a count of sub platforms of the sensor network platform. In this way, in terms of data connection, it may be possible to establish a physical connection between a single sub platform of the sensor network platform and an independent sub platform of the service platform. In some embodiments, when monitoring data used for protocol conversion through a same first processor is allocated by the management platform and stored in a specific sub platform of the service platform, sensors corresponding to the monitoring data may adopt a same one of following common protocols for data transmission: EtherCAT, ModBus, cellular, Wi-Fi, Bluetooth, ZigBee, 6LoWPAN, etc. The same communication protocol may determine that designs of the sensors and data characteristics and transmission characteristics of the monitoring data have certain similarities. For example, using the Bluetooth for data transmission may have characteristics of wireless data transmission and high data transmission rate, the characteristics determine that the sensors may be well used in image recognition technology. ZigBee data transmission may have characteristics of anti-interference and data security, the characteristics determine that the sensors may be well used in transmission of key parameter monitoring data in the production line; Cellular data transmission may have a characteristic of strong coverage, the characteristic determines that the sensors may be well used in monitoring data transmission with low delay requirements; EtherCAT may have a characteristic of high speed for data transmission, the characteristic determines that the sensors may be well used for monitoring data transmission with a plurality of data points and high response speed. Therefore, different third databases may be selected for data storage according to different communication protocols. In a later stage, whether the monitoring data is processed through each sub platform of the service platform, or the user platform obtains these monitoring data from the sub platforms of the service platform before data processing, the monitoring data with above similarities may be stored differently through a relationship between the service platform and the sensor network platform through the third databases. The monitoring data may be read through the third processor on each sub platform of the service platform or an adopted user platform before centralized processing, the above similarities facilitate using same data rules or framework to obtain more accurate and more corresponding processing results. In some embodiments, the centralized processing may be configured to perform data compensation processing on each monitoring data of these sensors before performing data change trend analysis. In some embodiments, a count of the sub platforms of the service platform may be greater than the count of the sub platforms of the sensor network platform. It may be set as that: when a single sensor network platform is configured with an independent sub platform of the service platform, the sub platforms of the service platform without the sub platform of the sensor network platform may be used to store other control data related to work of the production line, specifically control parameters associated with a control program proposed below.

At the same time, the scheme may be set as follows: sensors connected with a same sub platform of the sensor network platform may adopt a same communication protocol. It may also realize: during construction or optimization of the Industrial Internet of Things system, a variety of different types of sub platforms of the sensor network platform may be configured according to each data transmission need of each sensor. This method solves problems that a single gateway is responsible for a conversion of a plurality of communication protocols, which brings high requirements for a gateway configuration, such as data processing capacity, data transmission capacity, and data heterogeneity adaptability. In a process of adding sensor detection points or an amount of the monitoring data, the sub platforms of the sensor network platform may be added according to communication protocols of newly added sensors, and the additional sensor may be connected to the existing sensor network platform by using data processing and data transmission redundancy of existing sub platforms of the sensor network platform. In this way, whether it is an interactive debugging between the management platform and the sensor network platform or an interactive debugging between the sensor network platform and the object platform, compared with a centralized sensor network platform, it is convenient for system integration and conducive to a function expansion and system adjustment of the Internet of things system. In some embodiments, it may be preferred to adopt: according to a current sensor configuration or a configuration of process control points and monitoring points, each sub platform of the sensor network platform is set to have data processing and data transmission redundancy, so as to better solve above emphasized problems that are conducive to a functional expansion and system adjustment of the Internet of things system.

At the same time, the management platform may be set in a centralized layout in this scheme, which aims to realize that: for a relatively mature process that has been formed in a production process of the industrial Internet of things, one or more of a logical framework of a control program for an implementation of the process, an encryption mechanism in a data transmission process, and computing core areas that require high computing performance are concentrated on the management platform, which is conducive to the reliability and stability of the Industrial Internet of Things system. In a specific embodiment, the management platform may be configured to include second processors and second databases. Meanwhile, according to a scale of the industrial Internet of things, the second processors and the second databases may be configured as one or more. The one or more may be understood as one processor, one database, a plurality of processors, a plurality of databases, a plurality of processor modules, and a plurality of database modules. The plurality of processor modules may be understood as processor clusters, and the plurality of database modules may be understood as database clusters.

In this embodiment, those skilled in the art can undoubtedly conclude that in existing physical structures, a server may be used as a carrier of databases and the processors. For example, the first processor and the first database exist in a first server, and the third processor and a third database exist in a third server. With regard to above definitions of sub platform of the service platform and sub platform of the sensor network platform, it may be understood that the sub platform is a sub platform. In both the service platform and the sensor network platform, each may be a platform group formed by a plurality of sub platforms with the independent functions, and a single sub platform may have the independent functions. According to a specific hierarchy, as shown in FIG. 1, the sensor network platform 1 and the sensor network platform 2 may complete protocol conversion, data transmission, data storage, etc. In terms of physical architecture, the service platform 1 and the service platform 2 each may have databases defined as the third databases and processors defined as the third processors.

In some embodiments, the sensor network platform may be configured such that a count of sensors connected to each sub platform of the sensor network platform may be greater than or equal to 1.

The sensor network platform may be configured to include databases for storing received monitoring data from the sensors.

In each sub platforms of the sensor network platform, when a count of sensors connected to the sub platform of the sensor network platform is greater than 1, monitoring data from different sensors is stored in different addresses of the databases. In this embodiment, the similarity proposed above is further considered, and the similarity is more finely divided: a plurality of monitoring data from a same sensor may be stored in a third database under a same address, so that the monitoring data under the same address may be from the same sensor. In terms of data calling and data processing after calling, it may realize higher precision correction and reprocessing after correction. In some embodiments, when the count of sensors connected to each sub platform of the sensor network platform is equal to 1, according to storage rules of existing data in the third databases, there may be generally no problem of storing monitoring data from a same sensor source in different addresses. At the same time, according to characteristics of existing monitoring data transmission, a large count of sensors in the Industrial Internet of Things system and sensors using the same communication protocol, it may be set that the count of sensors connected to each sub platform of the sensor network platform is greater than 1. In this way, not only the count of sub platforms of the sensor network platform may be reduced, but also complexity of a data interaction link between the sensor network platform and the management platform may be simplified. At the same time, existing common gateways can meet data transmission requirements in the current development of the industrial Internet of things.

In some embodiments, it may be set that the sub platform of the sensor network platform is configured to include a data upload module and a processor, and the processor may send the monitoring data in the database to the management platform according to the settings of the processor or query instructions sent to the processor by the management platform.

When the processor determines that monitoring data of a sensor is missing, the processor may upload the monitoring data or a processing result in the database to the management platform according to the settings of the processor or the query instructions sent to the processor by the management platform.

The processing result may be that: taking the monitoring data stored in the database within a set time period as a calculation basis, taking a change trend of the monitoring data within the set time period as a calculation function, determining supplementary data at a specific time of data loss according to the specific time of data loss, and taking the supplementary data as the processing result. This scheme provides a specific data interaction mode between the sensor network platform and the management platform, specifically, the first processor proposed above may send data to the management platform according to the processor's own settings, or the first processor may upload data to the management platform according to the query instructions received from the second processor. When the first processor is configured to upload data according to the processor's own settings, the first processor may be set according to the settings. Parsed data, which is of a specified communication protocol type and includes specific sensor address information and monitoring data information, may be uploaded in real time or under a specified delay setting according to data packaging rules, timing rules, etc. Real-time query instructions may be configured to control sending of the monitoring data in the first database to the management platform through the query instructions actively sent by the management platform to the sensor network platform in any case. When the second processor determines that the monitoring data of a sensor is missing, for example, if data interaction between the sensor network platform and the management platform is realized through TCP protocol, the query instructions may be handshake instructions in a process of three handshakes. When other protocols are used for data transmission, those skilled in the art may use any available instruction method as the query instructions. The first database may be set to realize a corresponding query function, especially when it is used in an execution of the control program, so that the required monitoring data may have a stable source. At the same time, because the first database is used to store the monitoring data differently according to the monitoring data source, this scheme also has characteristics of convenient to call the required monitoring data in time. Furthermore, in this scheme, a specific data object may be the monitoring data itself or the processing result when the monitoring data is missing. During the specific implementation, feedback data may be used as the monitoring data or the processing result according to sensitivity of the specific embodiment to specific monitoring data and change rules of the monitoring data at specific monitoring positions. If a previous transfer process of intermittent and repeated transfer of raw materials or parts affects a next transfer process, when position or posture of the raw materials or parts is identified and an identification result is used as one of the monitoring data, the processing result may be preferably used as the feedback data. When the previous transfer process is not associated with the next transfer process and hardware settings are specified for corresponding position or attitude, latest monitoring data may be used as the feedback data. As for the processing result, as mentioned above, it can be understood that only for a group of arrays associated in time sequence, the data includes a plurality of monitoring data from a same sensor, so the above calculation function may be a data fitting result of associated time. When time corresponding to the required monitoring data is substituted into the calculation function, the processing result may be obtained.

In different parts of the present disclosure, a monitoring data calculation result may also be referred to as the supplementary data. Correspondingly, the above processing result may be as follows: taking the monitoring data stored in the database within a set time period as a calculation basis, taking a change trend of the monitoring data within the set time period as the calculation function, determining supplementary data at a specific time of data loss according to the specific time of data loss, and taking the supplementary data as the processing result. See FIG. 3 and its description for more information on the supplementary data.

FIG. 3 shows an exemplary flowchart of determining supplementary data according to some embodiments of the present disclosure. In some embodiments, the process 300 may be performed by sub platforms of the sensor network platform.

The production line is used to produce an injection molded part. Correspondingly, the monitoring data may include a holding pressure, a mold temperature, a melt temperature, and a holding time at each time when the injection molded part is produced. For example, the monitoring data may include data such as the holding pressure, the mold temperature, melt temperature, and holding time every 3 minutes during the production of the injection molded part. When the processor determines that at least one of the holding pressure, the mold temperature, and the melt temperature at a certain time is missing, the sub platforms of the sensor network platform may be further configured to execute the process 300 to determine the supplementary data at that time.

It should be understood that the holding time in the monitoring data may be a preset fixed value in a whole production line. Therefore, the holding time in the monitoring data may not be missing.

As shown in FIG. 3, the process 300 may include the following steps.

In step 310, the sub platforms of the sensor network platform obtain injection molded part information of the injection molded part.

The injection molded part information may refer to relevant information of injection molded part produced by the above-mentioned production line.

In some embodiments, the injection molded part information may include injection molded part structural parameters of the injection molded part, and the injection molded part structural parameters may at least include a wall thickness, a volume, a relative surface area, a count of symmetrical planes, a count of stiffeners, a count of planes, and a count of edges of the injection molded part. The injection molded part structural parameters may be obtained from relevant information entered by a user during production of the above injection molded part. For example, it may be obtained from a three-dimensional model of the injection molded part input by the user when producing the injection molded part, and the three-dimensional model may contain the injection molded part structural parameters.

In some embodiments, the injection molded part information may also include other content. For example, material information of the injection molded part may also be included, and the material information of the injection molded part may be determined by user input.

In step 320, the sub platforms of the sensor network platform determine the supplementary data through a data supplement model based on the monitoring data and the injection molded part information, the data supplement model being a trained machine learning model.

The supplementary data may refer to data that supplements a corresponding type of data at a time of missing in the monitoring data. For example, in the monitoring data, the mold temperature at 6th minute during the production of the injection molded part is missing. Correspondingly, the supplementary data may include the mold temperature at 6th minute.

In some embodiments, the monitoring data and the injection molded part information may be processed through the data supplement model to determine the supplementary data. The monitoring data may be characterized as a monitoring data sequence. Position of each element in the monitoring data sequence may represent a corresponding holding pressure, mold temperature, and melting temperature of each element at each time when the injection molded part is produced. It should be understood that since the holding time is a preset value, the above monitoring data sequence may or may not include the holding time.

It is worth noting that for time when the above monitoring data is missing, the data value of the type of data that is missing at the time when the above monitoring data is missing may be set as a preset value. For example, if the mold temperature at 6th minute is missing when producing the injection molded part in the monitoring data, the mold temperature at 6th minute in the monitoring data may be set to 0° C.

In some embodiments, the data supplement model may be a deep neural network model. Inputs of the data supplement model may include the monitoring data and injection molded part information, and an output of the data supplement model may be the supplementary data.

The data supplement model may be obtained through training. The sub platforms of the sensor network platform may obtain a plurality of sample monitoring data, the above sample monitoring data may include data such as the holding pressure, the mold temperature, the melt temperature, and the holding time at each time of production of a sample injection molded part. For each sample monitoring data, the sub platforms of the sensor network platform may extract at least one of data corresponding to the holding pressure, the mold temperature, the melt temperature, etc. at a certain time in the sample monitoring data. Extracted sample monitoring data and injection molded part information of the above sample injection molded part may be used as training samples, and extracted data at that time may be used as labels of the training samples. The training samples may be input into an initial data supplement model, and a loss function may be constructed based on the output of initial data supplement model and the labels of the training samples. Parameters of the initial data supplement model may be updated iteratively based on the loss function until preset conditions are met, the training may end, and trained data supplement model may be obtained. The preset conditions may include but are not limited to convergence of the loss function, training period reaching a threshold, etc.

In some embodiments, the data supplement model may comprise a feature extraction layer, a fusion layer, and a data supplement layer. The data supplement model may process the injection molded part structural parameters and the monitoring data to determine supplemented monitoring data. The supplemented monitoring data may include the supplementary data. For more information about the above embodiments, see FIG. 4 and its related descriptions.

Some embodiments of the present disclosure may process the monitoring data and injection molded part information through the data supplement model to determine the supplementary data. The supplementary data may be used to supplement missing data in the monitoring data, so as to understand the production of the injection molded part and ensure quality of the injection molded part. Through the machine learning model to determine the supplementary data, cost of manual processing may be reduced and the processing efficiency can be improved.

FIG. 4 shows a schematic diagram of a data supplement model according to some embodiments of the present disclosure.

As shown in FIG. 4, the data supplement model 420 may include the feature extraction layer 420-1, the fusion layer 420-2, and the data supplement layer 420-3. Inputs of the data supplement model 420 may include the injection molded part structural parameters 410 and the monitoring data 430, and an output of the data supplement model 420 may be the supplemented monitoring data 440. The above supplemented monitoring data may include the supplementary data. For example, when the mold temperature at 6th minute when the injection molded part is produced in the monitoring data is missing, the sub platforms of the sensor network platform may input the mold temperature 0° C. preset at 6th minute of the monitoring data with the injection molded part structural parameters to the data supplement model, and the output of the data supplement model may be the supplemented monitoring data. In the supplemented monitoring data, the mold temperature at 6th minute may be determined as 200° C., that is, the supplementary data may be that the mold temperature at 6th minute is 200° C.

In some embodiments, the feature extraction layer may be used to process the injection molded part structural parameters of the injection molded part and determine a complexity vector of the injection molded part. The feature extraction layer may be a neural network model. As shown in FIG. 4, an input of the feature extraction layer 420-1 may be the injection molded part structural parameters 410 of the injection molded part, and an output of the feature extraction layer 420-1 may be the complexity vector 421 of the injection molded part.

The complexity vector may be a vector that represents the injection molded part structural parameters. Dimensions of the complexity vector may be equal to a count of parameter types of the injection molded part structural parameters. A value of each dimension of the complexity vector may be equal to a value of injection molded part structural parameters of each injection molded part. For example, the injection molded part structural parameters of an injection molded part may include: wall thickness being 3 mm, volume being 15 cm³, relative surface area being 5 cm⁻¹, count of symmetrical planes being 3, count of stiffeners being 1, count of planes being 2, and count of edges being 8. The injection molded part structural parameters are input into the feature extraction layer, and an output complexity vector of the feature extraction layer may be (3, 15, 5, 3, 1, 2, 8).

In some embodiments, the fusion layer may be used to process the complexity vector and the monitoring data to determine a fusion feature vector at each time when producing the injection molded part.

Figure 5:
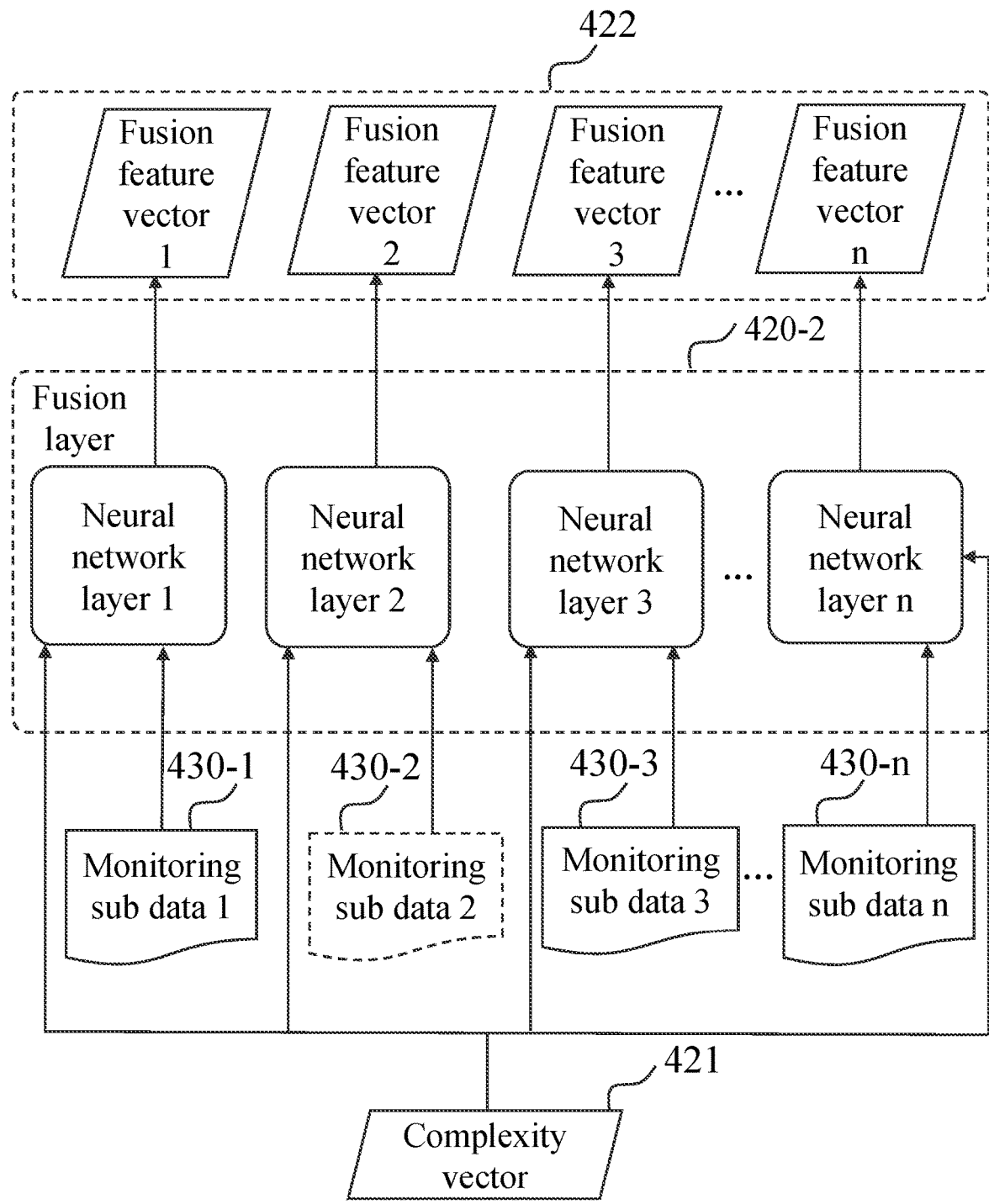
FIG. 5 shows a schematic diagram of determining a fusion feature vector according to some embodiments of the present disclosure.

As shown in FIG. 5, inputs of the fusion layer 420-2 may include the monitoring data 430 and the complexity vector 421 output by the feature extraction layer 420-1, and an output of the fusion layer 420-2 may be the fusion feature vector 422 at each time when the injection molded part is produced.

The fusion feature vector may be a vector obtained by fusing the monitoring data with the complexity vector. In some embodiments, a fusion method may be to expand dimensions of the complexity vector based on the complexity vector. A count of expanded dimensions may correspond to a count of data types contained in the monitoring data, and a value of each dimension added in the vector may correspond to a value of a data type of the monitoring data. In some embodiments, the fusion method may first generate a monitoring data vector based on the monitoring data; calculate the complexity vector and the monitoring data vector, and a calculated result may be used as the fusion feature vector. The calculation method may be to calculate a vector product of two vectors.

In some embodiments, the fusion layer may include a plurality of neural network layers. Inputs of each neural network layer may be monitoring sub data and the complexity vector at a time, and an output of each neural network layer may be the fusion feature vector at that time. The monitoring data may include a plurality of monitoring sub data. The monitoring sub data may be the holding pressure, the mold temperature, the melt temperature, and the holding time at a certain time.

As shown in FIG. 5, the fusion layer 420-1 may include a neural network layer 1, a neural network layer 2, a neural network layer 3, . . . , a neural network layer n. Inputs of the neural network layer 1 may include monitoring sub data 1 and the complexity vector 421, and an output of the neural network layer 1 may be a fusion feature vector 1 at a corresponding time of the monitoring sub data 1. Inputs of the neural network layer 2 may include monitoring sub data 2 and the complexity vector 421, and an output of the neural network layer 2 may be a fusion feature vector 2 at a corresponding time of the monitoring sub data 2. As an example only, at least one of the holding pressure, the mold temperature, and the melt temperature of the monitoring sub data 2 may be missing; inputs of the neural network layer 3 may include monitoring sub data 3 and the complexity vector 421, and an output of the neural network layer 3 may be a fusion feature vector 3 at a corresponding time of the monitoring sub data 3; . . . , inputs of the neural network layer n may include monitoring sub data n and the complexity vector 421, and an output of the neural network layer n may be the fusion feature vector n at a corresponding time of the monitoring sub data n.

In some embodiments, a plurality of neural network layers in the fusion layer may share parameters.

In some embodiments, the data supplement layer may process the fusion feature vector at each time when producing the injection molded part to determine the supplemented monitoring data. The supplemented monitoring data may include the supplementary data. The data supplement layer may be a Bidirectional Encoder Representation from Transformers (BERT) model. As shown in FIG. 4, an input of the data supplement layer 420-3 may be the fusion feature vector 422 at each time when the injection molded part is produced, and output of the data supplement layer 420-3 may be the supplemented monitoring data 440.

In some embodiments, the data supplement layer may be implemented based on an attention mechanism. The attention mechanism may mean that different input data are given different attention values. The larger the attention value is, the greater impact of the input data on model operation results is. For example, data that is closer to a missing time in time may be given a larger attention value.

In some embodiments, the data supplement model may also monitor data at other times in the monitoring data when there is no missing. When the data supplement model determines that a certain data is abnormal, the data supplement model may adjust the data in output supplemented monitoring data. For example, in the monitoring data input in the data supplement model, the mold temperature in 9th minute when producing the injection molded part may be 50° C. When the data supplement model processes data again and determines that the mold temperature in 9th minute being 50° C. is abnormal, the data may be adjusted. The supplemented monitoring data output from the data supplement model may include that the mold temperature in 9th minute is 250° C.

In some embodiments, the data supplement model may be obtained by jointly training the feature extraction layer, the fusion layer, and the data supplement layer. The sub platforms of the sensor network platform may obtain a plurality of sample monitoring data. The above sample monitoring data may include data such as the holding pressure, the mold temperature, the melt temperature, and the holding time at each time of producing the sample injection molded part. For each sample monitoring data, at least one of the holding pressure, the mold temperature, the melt temperature, and other data corresponding to a certain time in the sample monitoring data may be extracted, the extracted sample monitoring data and the injection molded part information of the above sample injection molded part may be used as the training samples, and the extracted data at that time may be used as labels of the training samples. The injection molded part information in the training samples is input into an initial feature extraction layer, an output of the initial feature extraction layer and extracted sample monitoring data in the training samples are input into an initial fusion layer, an output of the initial fusion layer is input into an initial data supplement layer, and a loss function is constructed based on the output of the initial data supplement layer and label. Parameters of the initial feature extraction layer, the initial fusion layer, and the initial data supplement layer may be iteratively updated based on the loss function until preset conditions are met, the training may end, the parameters of the feature extraction layer, the fusion layer, and the data supplement layer are determined, and trained data supplement model may be obtained. The preset conditions may include but are not limited to convergence of the loss function, training period reaching a threshold, etc.

Obtaining parameters of the data supplement model through the above training method is helpful to solve the problem that it is difficult to obtain labels when training the feature extraction layer and fusion layer in the data supplement model alone in some cases.

In some embodiments of the present disclosure, the supplemented monitoring data may be determined by the data supplement model including the feature extraction layer, the fusion layer, and the data supplement layer, which can enable each layer of the data supplement model to process different types of data respectively and improve the accuracy of the supplemented monitoring data.

In some embodiments, it may be set that the monitoring data as the calculation basis may be all data of sensors with missing monitoring data stored in the sensor network platform.

A way the sensor network platform stores the monitoring data may be as follows: for any sensor, according to database storage space set for the monitoring data from the sensor, when there is idle available space in the database storage space, new monitoring data may continue to expand a data storage capacity of the database. When the database storage space reaches a maximum storage capacity, the data storage capacity in the database is maintained, and monitoring data written in real time may cover monitoring data with an earliest storage time in the database.

When the processor determines that the monitoring data of a sensor is missing, the sub platform of the sensor network platform connected with the sensor may upload a prompt data instruction including an identification of a faulty sensor to the management platform, the faulty sensor may be a sensor with missing monitoring data. In this scheme, all the data can be understood as: since any database has a specific maximum capacity, if the maximum capacity of the first database is set or selected as required, if a calculation function is obtained by means of data fitting, accuracy of the calculation function may be improved by using all the data to facilitate the accuracy of calculation results. At the same time, this scheme provides a specific way for the first database to store data, specifically: for any first database, when a data size in the first database does not reach a maximum value, as much monitoring data as possible are stored to increase a local storage capacity of the monitoring data for later calling and completion of the above calculation function acquisition. When a maximum storage capacity is reached, an amount of data that can be stored in the first database is maintained, and a new monitoring data may be stored by covering monitoring data with an earliest storage time in the database. In this way, by setting data in the first database to a maximum capacity of an available data storage space, all data stored in the first database may be only current recent data, so as to improve referentiability and call value of local data. Further, for the above proposed determination of missing monitoring data, when a data interaction between the sensor network platform and the management platform is realized through TCP protocol, the processor may be the second processor on the management platform or the first processor on the sensor network platform. The specific determination method may be based on collection rules set for the sensor and sensor signal acquisition trigger rules, etc. Considering that the sensor signal acquisition caused by working environment factors and sensor faults may not be recovered by itself, and because of a network transmission problem, the second processor may be more likely to have the determination of missing monitoring data than the first processor. Therefore, in this scheme, it is preferable to use proposed first processor to determine the missing monitoring data. The identification of a faulty sensor in the prompt data instruction may be obtained through an association between each storage address in the first database and the sensor. The identification of a faulty sensor may be obtained according to the collection rules set for the sensor, the sensor signal collection trigger rules, and each IP address of each sensor. With this scheme, fault status of each sensor may be obtained in time to complete timely maintenance of the object platform.

In some embodiments, it may be set as that: any sub platform of the sensor network platform and sub platform of the service platform establishing data connection with the sub platform of the sensor network platform may be configured as follows: the management platform receives the monitoring data from the sub platform of the sensor network platform and distributes the monitoring data to the sub platform of the service platform, the sub platform of the service platform store and process received monitoring data, and transmit the monitoring data and/or data processing results to the user platform, respectively. This scheme provides a specific data interaction mode between the sensor network platform and the service platform. Using this mode, it may be configured as follows: the monitoring data in B time period may be stored through the third database on the service platform, and the monitoring data in B time period may be used to provide data basis for human-computer interaction and self-learning optimization of the Industrial Internet of Things system, and provide control program for controlling parameter calling or generation basis for a loss of the monitoring data. The method for storing and processing the received monitoring data, and transmitting the monitoring data, and/or data processing results to the user platform may be used to complete the human-computer interaction between the Industrial Internet of Things system and the user. Further, according to each role that each level of the Industrial Internet of Things system needs to play in the system, it may be configured to store the monitoring data in A time period through the first database on the sensor network platform. The A time period may be shorter than the B time period, and the A time period may be included in the B time period. Therefore, a relationship between the first database and the third database only may need to be configured so that a storage space of the first database may be smaller than the storage space of the third database. The monitoring data in the first database may be used to control program parameter call and generation, and the monitoring data in the third database may be used for system self-learning and human-computer interaction.

Further, it may be set as that: any sub platform of the sensor network platform may be configured to include a driver download module for downloading drivers from the sub platforms of the service platform establishing data connection with the sub platform of the sensor network platform.

The sub platform of the sensor network platform may replace an original driver after receiving a new driver. As mentioned above, for a hardware system and a software system of the industrial Internet of things, generally, after the process design is completed, actuators used for product manufacturing and testing in the production line that completes the production process may be fixed. In recent years, the sensor technology is developing rapidly. In order to make new sensor technology or optimized sensor technology be conveniently applied to the Industrial Internet of Things system, and make each sub platform of the sensor network platform be applied to different positions of the Industrial Internet of Things system: according to communication protocol conversion needs of specific positions, sensors that can adapt to a current communication protocol at each position may be set as the sub platforms of the sensor network platform, including a driver download module. In this way, when any sub platform of the sensor network platform is connected to a hierarchical relationship of the industrial Internet of things, under an action of the driver download module, the sub platforms of the sensor network platform may obtain appropriate drivers from the sub platforms of the service platform to adapt to currently set work requirements. At the same time, in this scheme, the sub platforms of the service platform may be used as an upload carrier of the driver. When it is necessary to configure with a driver for any sub platform of the sensor network platform, it is convenient to solve security problems of data interaction in the Industrial Internet of Things system: through a role of the management platform as a data interaction medium between the service platform and the sensor network platform, it is verified and controlled whether the driver loading is completed, so as to avoid a problem of poor security and controllability in loading and verifying local drivers only on the sub platforms of the sensor network platform. The sub platforms of the service platform may be used as an upload medium of the driver in the system. By configuring whether there is a new driver that can be loaded in the sub platforms of the service platform, a problem of poor security controllability can be avoided by loading and verifying a local driver only in the sub platform of the sensor network platform.

Further, it may be set as that: the management platform is configured to store a control program that drives operation of production line equipment.

The service platform is configured as databases storing control parameters.

The management platform calls the control parameters in the database through communication channels with the service platform and configures with the control parameters in the control program to control the operation of production line equipment.

A data interaction mode between the user platform and the service platform is configured to modify and delete the control parameters in the service platform through data transmission between the user platform and the service platform. This scheme provides a method to set the control program and control parameters in a centralized way and realize the purpose of the management platform to control equipment of the production line by transferring the control parameters to the control program. In the specific scheme, centralized setting of the control program in the management platform can not only simplify the deployment of the Industrial Internet of Things system, but also complete the configuration, modification, and replacement of the control program as a whole. Compared with decentralized control program deployment, the centralized deployment method can relatively reliably protect the data of the control program, which is conducive to the reliability and security of the Industrial Internet of Things system. At the same time, database configured to store the control parameters is located on the service platform, which has the following characteristics: the second processor that undertakes a control calculation of the Industrial Internet of Things system and the third database may be set in different places. If necessary, the second processor may obtain required control parameters from the third database through remote data interaction. In this way, the management platform may be understood as an operator providing computing power. The service platform may belong to the user and may be set locally, which is convenient for integrating social resources and for fine and large design and application of the Industrial Internet of Things system. Furthermore, the set data interaction mode between the user platform and the service platform may be a specific human-computer interaction mode. By modifying and deleting the control parameters, problem of artificial update of the control strategy of the Industrial Internet of Things system is solved.

In some embodiments, it may be set as that: the control parameters are stored in the database of the service platform in a form of arrays.

Each array may include all the control parameters required by the control program, the management platform may call a group of arrays by the service platform at a single time for configuring the control program.

A database storing the control parameters may be located on a unique sub platform of the service platform.

The unique sub platform of the service platform may refer to: in the sub platform of the service platform, a sub platform for establishing data connection with the sub platform of the sensor network platform and a sub platform for storing the control parameters may be different sub platforms. This scheme provides a specific control parameter call scheme, which is used to solve possible harm to the Industrial Internet of Things system caused by wrong call of control parameters in view of the general need for a plurality of control parameters in the control program. Specifically, the control parameters and arrays may be stored on the service platform, and the management platform may call a group of arrays by the service platform to configure the control program. In this way, when the control program needs to be configured with different control parameters, a method of storing in an array and calling a group of arrays at a single time can ensure an optimal or correct relationship between the control parameters called at a single time. Further, as mentioned above, in a relationship between the sensor network platform and the service platform, there is a specific relationship between the sub platform of the sensor network platform and the sub platform of the service platform. In this scheme, the database set to store the control parameters may be located on a unique sub platform service platform. In this way, it is easy to realize that: it can not only simplify the data structure design of the sub platform of the service platform, but also differentiate the use, management, and maintenance of the sub platform of the service platform storing the control parameters and the monitoring data.

The present disclosure also discloses a control method of an Industrial Internet of Things system conducive to system scalability, the control method may be applied to the following Industrial Internet of Things system, the Industrial Internet of Things system comprises a user platform, a service platform, a management platform, a sensor network platform and an object platform which are interacted sequentially.

The service platform and the sensor network platform may adopt independent layout, and the management platform may adopt centralized layout.

The independent layout may mean that a platform has a plurality of independent databases, processors, and/or information channels, according to a classification of data, different types of data are stored in different databases, processed by different processors, and/or transmitted by different information channels.

The service platform and the sensor network platform may both include a plurality of sub platforms, and each sub platform may be provided with a database, a processor, and/or an information channel.

The centralized layout may mean that a platform receives data, processes data, and sends data uniformly.

The object platform may be configured to include a production line for manufacturing parts and/or forming assemblies, and the production line may be configured with a plurality of sensors serving manufacturing and/or assembly.

In each sub platform of the sensor network platform, any sub platform may be connected to some sensors in the plurality of sensor, and a same communication protocol is used with the sensors connected to a same sub platform of the sensor network platform.

A count of sub platforms of the service platform may be greater than or equal to a count of sub platforms of the sensor network platform, any sub platform of the sensor network platform may be connected with a unique sub platform of the service platform through the management platform, different sub platforms of the sensor network platform may establish data connections with different sub platforms of the service platform.

The user platform may receive data from the service platform and modify data in the service platform by interacting with the service platform.

The management platform transmits and stores operation data of the object platform to the service platform according to settings through the sensor network platform.

The management platform may receive data from the service platform and control operations of the object platform.

According to a connection relationship established between the sub platforms of the service platform and the sub platforms of the sensor network platform, the management platform may transfer and store monitoring data of any sub platform of the sensor network platform to the sub platforms of the service platform connected to the sub platform of the sensor network platform. The control method proposed in this scheme may be implemented based on the Industrial Internet of Things system proposed above. In the specific method, a coordination relationship among all levels of the Industrial Internet of Things system in the working process is emphasized, the core idea is to select the type according to the sensor communication protocol, and use the data interaction and storage rules proposed above to store the monitoring data with the same or similar relationship as centrally as possible. When reusing these data, the value of the data may be improved. At the same time, the specific data interaction and the storage rules may facilitate the system scalability of the Industrial Internet of Things system.

Further, it may be set as that: any sub platform of the service platform may be that address information of a corresponding sensor is stored, the corresponding sensor is a sensor connected to a corresponding sub platform of the sensor network platform, and the corresponding sub platform of the sensor network platform is the sub platform of the sensor network platform connected with sub platform data of the service platform.

The user platform receives the address information from the service platform through interaction with the service platform.

In any sub platform of the service platform, for the monitoring data from any sensor, associating the monitoring data with the address information of the corresponding sensor. One of design purposes of this scheme is to emphasize relationships between the monitoring data and specific sensors in the sub platform of the service platform. When these monitoring data are used through the sub platform of the service platform and the user platform, specific source of any monitoring data can be directly obtained, and specific address information may be fragment identification data in the data output by the sensor. Specific applications: sensor debugging, sensor fault diagnosis and upgrading.

Specific embodiments described above further describe the purpose, technical scheme and beneficial effects of the present disclosure. It should be understood that the above are only the specific embodiments of the present disclosure and are not used to limit the scope of protection of the present disclosure. Any modifications, equivalent replacements, improvements, etc. made within the spirit and principles of the present disclosure should be included in the scope of protection of the present disclosure.

The basic concepts have been described above. Obviously, for those skilled in the art, the above detailed disclosure is only an example and does not constitute a limitation of the present disclosure. Although it is not explicitly stated here, those skilled in the art may make various modifications, improvements and amendments to the present disclosure. Such modifications, improvements and amendments are suggested in the present disclosure, so such modifications, improvements and amendments still belong to the spirit and scope of the exemplary embodiments of the present disclosure. Meanwhile, the present disclosure uses specific words to describe the embodiments of the present disclosure. For example, "one embodiment", and/or "some embodiments" mean a certain feature or structure related to at least one embodiment of the present disclosure. Therefore, it should be emphasized and noted that "one embodiment" or "an alternative embodiment" mentioned twice or more in different positions in the present disclosure does not necessarily refer to the same embodiment. In addition, certain features or structures in one or more embodiments of the present disclosure may be appropriately combined.

In addition, unless explicitly stated in the claims, the sequence of processing elements and sequences, the use of numbers and letters, or the use of other names described in the present disclosure are not used to define the sequence of processes and methods in the present disclosure. Although the above disclosure has discussed some currently considered useful embodiments of the invention through various examples, it should be understood that such details are only for the purpose of explanation, and the additional claims are not limited to the disclosed embodiments. On the contrary, the claims are intended to cover all amendments and equivalent combinations that conform to the essence and scope of the embodiments of the present disclosure. For example, although the system components described above can be implemented by hardware devices, they can also be implemented only by software solutions, such as installing the described system on an existing server or mobile device.

Similarly, it should be noted that, in order to simplify the description disclosed in the present disclosure and thus help the understanding of one or more embodiments of the invention, the foregoing description of the embodiments of the present disclosure sometimes incorporates a variety of features into one embodiment, the drawings or the description thereof. However, this disclosure method does not mean that the object of the present disclosure requires more features than those mentioned in the claims. In fact, the features of the embodiments are less than all the features of the single embodiments disclosed above.

In some embodiments, numbers describing the number of components and attributes are used. It should be understood that such numbers used in the description of embodiments are modified by the modifier "about", "approximate" or "generally" in some examples. Unless otherwise stated, "approximately" or "generally" indicate that a ±20% change in the figure is allowed. Accordingly, in some embodiments, the numerical parameters used in the description and claims are approximate values, and the approximate values can be changed according to the characteristics required by individual embodiments. In some embodiments, the numerical parameter should consider the specified significant digits and adopt the method of general digit reservation. Although the numerical fields and parameters used to confirm the range breadth in some embodiments of the present disclosure are approximate values, in specific embodiments, the setting of such values is as accurate as possible within the feasible range.

For each patent, patent application, patent application disclosure and other materials cited in the present disclosure, such as articles, books, specifications, publications, documents, etc., the entire contents are hereby incorporated into the present disclosure for reference. Except for the application history documents that are inconsistent with or conflict with the contents of the present disclosure, and the documents that limit the widest range of claims in the present disclosure (currently or later appended to the present disclosure). It should be noted that in case of any inconsistency or conflict between the description, definitions, and/or use of terms in the supplementary materials of the present disclosure and the contents described in the present disclosure, the description, definitions, and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. Therefore, as an example rather than a limitation, the alternative configuration of the embodiments of the present disclosure can be regarded as consistent with the teachings of the present disclosure. Accordingly, the embodiments of the present disclosure are not limited to those explicitly introduced and described in the present disclosure.

What is claimed is:

1. An Industrial Internet of Things system conducive to system scalability, comprising: a user platform, a service platform, a management platform, a sensor network platform, and an object platform which are interacted sequentially, wherein
    the service platform and the sensor network platform adopt independent layout, and the management platform adopts centralized layout;
    the independent layout means that a platform has a plurality of independent databases, processors, and/or information channels, according to a classification of data, different data are stored in different databases, processed by different processors, and/or transmitted by different information channels;
    the service platform and the sensor network platform both include a plurality of sub platforms, and each sub platform is provided with a database, a processor, and/or an information channel;
    the centralized layout means that a platform receives data, processes data, and sends data uniformly;
    the object platform is configured to include a production line for manufacturing parts and/or forming assemblies, and the production line is configured with a plurality of sensors serving manufacturing and/or assembly;
    any one of the plurality of sub platforms of the sensor network platform is connected to some sensors in the plurality of sensors, and sensors connected to a same sub platform of the sensor network platform adopt a same communication protocol;
    a count of sub platforms of the service platform is greater than or equal to a count of sub platforms of the sensor network platform, any one of the plurality of sub platforms of the sensor network platform is connected with a unique sub platform of the service platform through the management platform, and different sub platforms of the sensor network platform establish data connections with different sub platforms of the service platform; and
    any one of a plurality of sub platforms of the sensor network platform and a sub platform of the service platform establishing data connection with the sub platform of the sensor network platform are configured to:
        receive, by the management platform, monitoring data from the sub platform of the sensor network platform and send the monitoring data to the sub platform of the service platform; and
        store and process, by the sub platform of the service platform, the monitoring data and transmit the monitoring data or data processing results to the user platform, respectively.

2. The Industrial Internet of Things system conducive to system scalability of claim 1, wherein
    a count of sensors connected to each of the plurality of sub platforms of the sensor network platform is greater than or equal to 1;
    the sensor network platform includes databases for storing the monitoring data from the sensors; and
    when the count of sensors connected to the sub platform of the sensor network platform is greater than 1, the monitoring data from the sensors is stored in different addresses of the databases.

3. The Industrial Internet of Things system conducive to system scalability of claim 2, wherein
    each of the plurality of sub platforms of the sensor network platform includes a data upload module and a processor, the processor sends the monitoring data of the database to the management platform according to settings of the processor or query instructions sent to the processor by the management platform;
    when the processor determines that the monitoring data of a sensor is missing, the processor uploads the monitoring data or a processing result of the database to the management platform according to the settings of the processor or the query instructions sent to the processor by the management platform; and
    the processing result is determined by: taking the monitoring data stored in the database within a set time period as a calculation basis, taking a change trend of the monitoring data within the set time period as a calculation function, determining a supplementary data at a data loss time according to the data loss time, and taking the supplementary data as the processing result.

4. The Industrial Internet of Things system conducive to system scalability of claim 3, wherein the monitoring data used as calculation basis is all data of sensors with missing monitoring data stored in the sensor network platform;
    a way of storing the monitoring data in the sensor network platform is:
        for any sensor, according to a storage space of the database set for the monitoring data from the sensor, new monitoring data continuing to be stored to expand a data storage capacity of the database when there is idle available space in the storage space of the database; and when there is no idle available space in the storage space of the database, maintaining the data storage capacity of the database, and covering an earliest monitoring data stored in the database with the monitoring data written in a real-time; and when the processor determines that the monitoring data of the sensor is missing, the sub platform of the sensor network platform connected with the sensor uploading a prompt data instruction to the management platform, wherein the prompt data instruction includes an identification of a faulty sensor, and the faulty sensor is a sensor with missing monitoring data.

5. The Industrial Internet of Things system conducive to system scalability of claim 1, wherein the management platform is configured to store a control program that drives operation of production line equipment;

the service platform includes databases for storing control parameters;

the management platform is configured to call the control parameters in the database by communicating with the service platform through communication channels and configure the control parameters in the control program to control the operation of production line equipment; and a data interaction mode between the user platform and the service platform is modifying and deleting the control parameters in the service platform through data transmission between the user platform and the service platform.

6. The Industrial Internet of Things system conducive to system scalability of claim 5, wherein the control parameters are stored in the databases of the service platform in a form of arrays;

each array includes all the control parameters required by the control program, the management platform is configured to call a group of arrays by the service platform at a single time for configuring the control program;

the database storing the control parameters is located on an independent sub platform of the service platform; and the independent sub platform of the service platform refers to a sub platform for establishing data connection with the sub platform of the sensor network platform or storing the control parameters.

7. The Industrial Internet of Things system conducive to system scalability of claim 1, wherein each of the plurality of sub platforms of the sensor network platform includes driver download module for downloading drivers from the sub platforms of the service platform, wherein data connection is established between the sub platforms of the service platform and the sub platforms of the sensor network platform; and the sub platforms of the sensor network platform replace an original driver after receiving a new driver.

8. A control method of an Industrial Internet of Things system conducive to system scalability, wherein the control method is applied to the Industrial Internet of Things system, the Industrial Internet of Things system comprises a user platform, a service platform, a management platform, a sensor network platform, and an object platform which are interacted sequentially;

the service platform and the sensor network platform adopt independent layout, and the management platform adopts centralized layout;

the independent layout means that a platform has a plurality of independent databases, processors, and/or information channels, according to a classification of data, different data are stored in different databases, processed by different processors, and/or transmitted by different information channels;

the service platform and the sensor network platform both include a plurality of sub platforms, and each sub platform is provided with a database, a processor, and/or an information channel;

the centralized layout means that a platform receives data, processes data, and sends data uniformly;

the object platform is configured to include a production line for manufacturing parts and/or forming assemblies, and the production line is configured with a plurality of sensors serving manufacturing and/or assembly;

any one of the plurality of sub platforms of the sensor network platform is connected to some sensors in the plurality of sensors, and sensors connected to a same sub platform of the sensor network platform adopt a same communication protocol; and a count of sub platforms of the service platform is greater than or equal to a count of sub platforms of the sensor network platform, any one of the plurality of sub platforms of the sensor network platform is connected with a unique sub platform of the service platform through the management platform, and different sub platforms of the sensor network platform establish data connections with different sub platforms of the service platform;

wherein the user platform receives data from the service platform and modifies data in the service platform by interacting with the service platform;

the management platform transmits and stores operation data of the object platform to the service platform according to settings through the sensor network platform;

the management platform receives data from the service platform and controls operations of the object platform; and according to a connection relationship established between the sub platform of the service platform and the sub platform of the sensor network platform, the management platform transmit and stores monitoring data of any one of a plurality of sub platforms of the sensor network platform to the sub platform of the service platform connected to the sub platform of the sensor network platform.

9. The control method of the Industrial Internet of Things system conducive to system scalability of claim 8, wherein any one of the plurality of sub platforms of the service platform is configured to store an address information of a corresponding sensor, wherein the corresponding sensor is a sensor connected to a corresponding sub platform of the sensor network platform, and the corresponding sub platform of the sensor network platform is the sub platform of the sensor network platform connected with the sub platform of the service platform;

the user platform receives the address information from the service platform through interacting with the service platform; and in any one of the plurality of sub platforms of the service platform, the monitoring data is associated with the address information of the corresponding sensor for the monitoring data from any sensor.

* * * * *